United States Patent

[11] 3,609,698

[72] Inventor Edward D. McCormick
Scotia, N.Y.
[21] Appl. No. 779,568
[22] Filed Nov. 27, 1968
[45] Patented Sept. 28, 1971
[73] Assignee General Electric Company

[54] CONTROL STATION FOR TWO-WAY ADDRESS COMMUNICATION NETWORK
8 Claims, 8 Drawing Figs.

[52] U.S. Cl. .......... 340/172.5
[51] Int. Cl. .......... G08b 29/00, H04l 11/06
[50] Field of Search .......... 340/172.5; 235/157

[56] References Cited
UNITED STATES PATENTS

| | | | |
|---|---|---|---|
| 3,401,380 | 9/1968 | Bell et al. .......... | 340/172.5 |
| 3,403,382 | 9/1968 | Frielinghaus et al. .......... | 340/172.5 |
| 3,407,387 | 10/1968 | Looschen et al. .......... | 340/172.5 X |
| 3,490,003 | 1/1970 | Herold et al. .......... | 340/172.5 |

*Primary Examiner*—Paul J. Henon
*Assistant Examiner*—Harvey E. Springborn
*Attorneys*—John F. Ahern, Paul A. Frank, Vance A. Smith, Frank L. Neuhauser, Oscar B. Waddell and Melvin M. Goldenberg

ABSTRACT: A communication network comprising a central station and a plurality of communication response units establishes communication therebetween when the central station transmits a reset pulse followed by a particular unit address and an interrogating code (read function code) to the response units. This initiates a "communication cycle" during which the central station communicates with a particular response unit. Each response unit has storage elements which are set in a ready-to-receive state by the reset pulse. The addressed response unit responds with either a data signal carrying the unit address and data information for the central station or an idle signal carrying the unit address and indicating no data. The central station includes an element which is able to distinguish between the two signals. Upon receiving a data signal from the response unit, the central station checks the received signal for correctness and clears that response unit by transmitting an initial reset pulse followed by the same unit address and a clear function code which empties the addressed unit of the data stored therein. When the idle signal is received, the central station simply initiates another communication cycle with another response unit. When the central station determines that there is an error in transmission or a mismatch between the transmitted and received unit address, the reset pulse, unit address, and read function code are retransmitted to the same response unit. When there is a second occurrence of error or mismatch, the reset pulse, the unit address, and an error function code are transmitted and a new communication cycle is initiated with another response unit.

Figure 1:
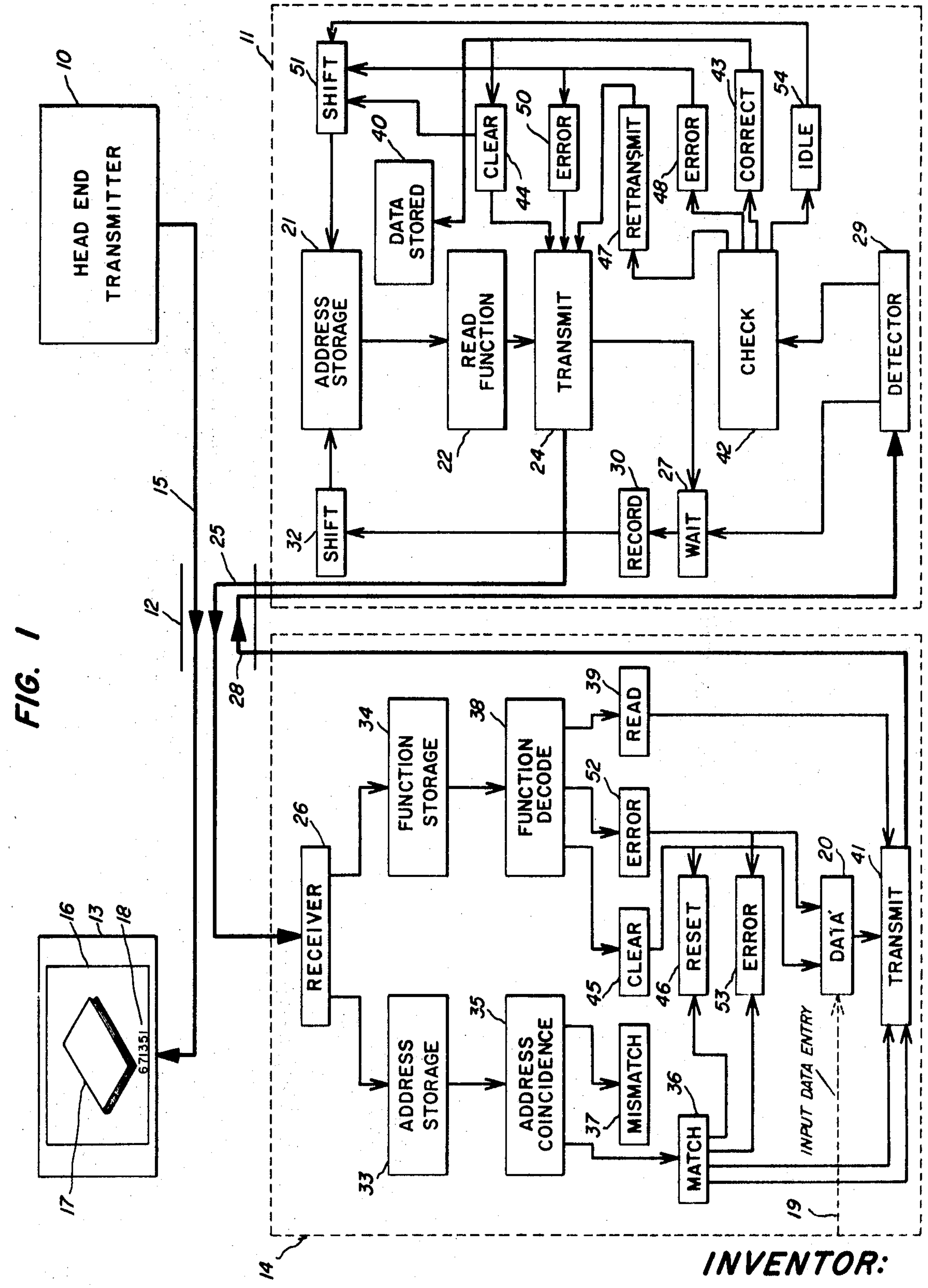

INVENTOR:
EDWARD D. McCORMICK,
by Paul A. Frank
HIS ATTORNEY

INVENTOR:

EDWARD D. McCORMICK, by Paul A. Frank

HIS ATTORNEY

INVENTOR:
EDWARD D. McCORMICK,
by Paul A. Frank
HIS ATTORNEY

INVENTOR:
EDWARD D. McCORMICK,
by Paul A. Franke
HIS ATTORNEY

INVENTOR:
EDWARD D. McCORMICK,
by Paul A. Frank
HIS ATTORNEY

CONTROL STATION FOR TWO-WAY ADDRESS COMMUNICATION NETWORK

This invention relates to a communication network, and more particularly, to high-speed, address communication network having a central station and a plurality of communication response units.

The diverse use of communication networks are well known in the prior art. For example, communication networks encompass such varied fields in telemetric, educational television, and community antenna television networks. Typically, such networks comprise one central station and a plurality of remote units. The remote units according to the type of network employed have varied capabilities. The simplest unit is capable of reception only and may be capable of electrically or optically displaying the received information. A more complex unit has the added capability of an automatic response to an interrogation signal by the central station. Still more sophisticated units respond only when addressed. An example of such a sophisticated unit is disclosed in copending application Ser. No. 779,488, now U.S. Pat. No. 3,541,257, of Edward D. McCormick et al., filed concurrently herewith and assigned to the same assignee as the present invention. Such communication response units (CRU) are advantageous in communication networks due to their multimodal operation. For example, the CRU is capable of receiving and storing data and transmitting it to the central station upon command or, in the alternative, when void of data, transmitting a signal indicating the lack of data.

It has become increasingly evident that, due to the complexity of the data transmitted over such communication networks and due to the large number of units on the networks, the central station must be capable not only of high speed transmissions but must also be capable of determining whether or not each received signal is from the addressed unit and has meaning. These capabilities are necessitated due to the interferences by noise and other electronic disturbances.

The storage capabilities of the communication response units may also be affected by electronic disturbances. For example, in address networks, it is often convenient to employ storage registers which ordinarily consist of a series of binary flip-flop circuits. It is necessary for each flip-flop circuit to be in a selected state (usually reset) prior to receiving the address. Electronic disturbances, however, can cause the circuits to be in the wrong state when the address is received, further causing failure of the addressed unit to respond properly. It would be advantageous, therefore, to provide an address network with the added capability of minimizing electronic disturbance effects upon the communication storage elements within each CRU prior to reception of the address and other communications.

It is therefore a primary object of my present invention to provide for a communication network having a central station capable of transmitting in a predetermined sequence reset signals for resetting appropriate elements within each CRU followed by address and interrogating signals to the units, scanning the response signals for errors, operating in one mode in response to a received correct signal, and operating in another mode in response to a received erroneous signal.

Another object of my present invention is to provide for a communication network having a central station capable of reinterrogating a unit which has responded with an erroneous signal and is further capable of storing the address of a unit which has not responded to an interrogating signal in a predetermined time period.

Briefly, and in accordance with my invention, a central station in a communication network initiates a communication cycle with a selected CRU by transmitting a reset pulse followed by the unit address and an interrogation code (hereafter called read code). Each CRU is capable of transmitting either a data or idle signal, both of which include the address of the CRU. The central station enters into a wait period while waiting for a response signal. When there is no response during the wait period, the central station stores the address of the nonresponding CRU and initiates a new communication cycle with another response unit as determined by the order of sequence of cycles.

When, however, there is a response before the end of the wait period, the central station (in the case of a data signal) stores the address and data received from the responding CRU, transmits a reset pulse, the unit address, and a clear code to the CRU which clears the data stored therein, and initiates a new communication cycle. The central station responds to an idle signal merely by initiating a new communication cycle.

The central station is also capable of determining whether the signal transmitted by a responding CRU is erroneous in some respect, i.e., lack of address coincidence or wrong parity. The first occurrence of error causes the central station to retransmit the unit address and read code. An error in response to the retransmission then causes the central station to transmit the unit address accompanied by an error code and to initiate a new communication cycle.

The novel features believed characteristic of the present invention are set forth in the appended claims. The invention itself, together with further objects and advantages thereof may be best understood with reference to the following description, taken in connection with the accompanying drawings in which:

FIG. 1 is a flow diagram illustrating the functional operation of the communication network of my present invention.

FIGS. 2*a*, 2*b*, 2*c*, and 2*d* illustrate, respectively, square wave configuration of binary coded information, synchronizing clock pulses, a reset pulse, and superimposition of all the square wave configurations.

Figure 3A:
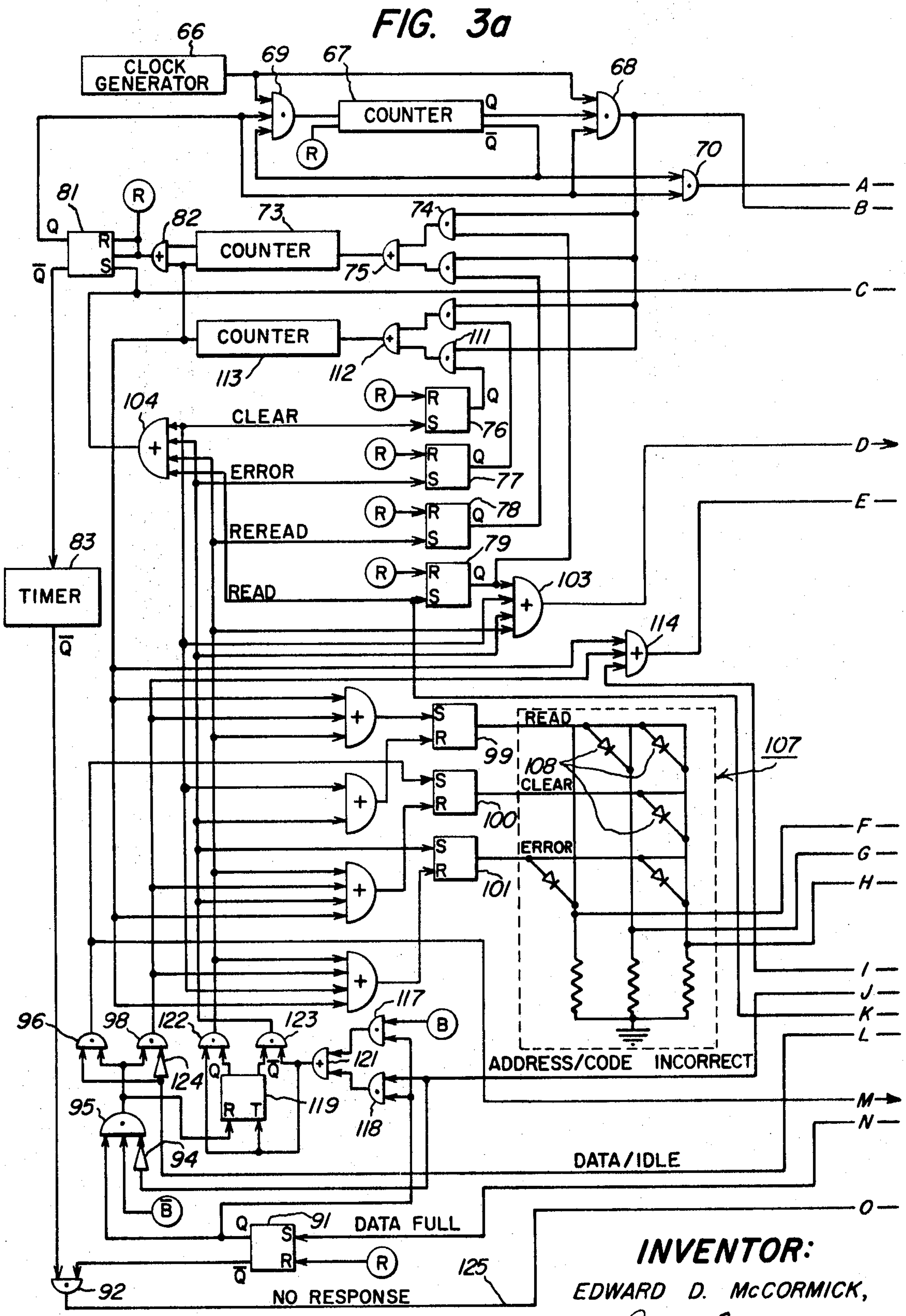
Figure 3B:
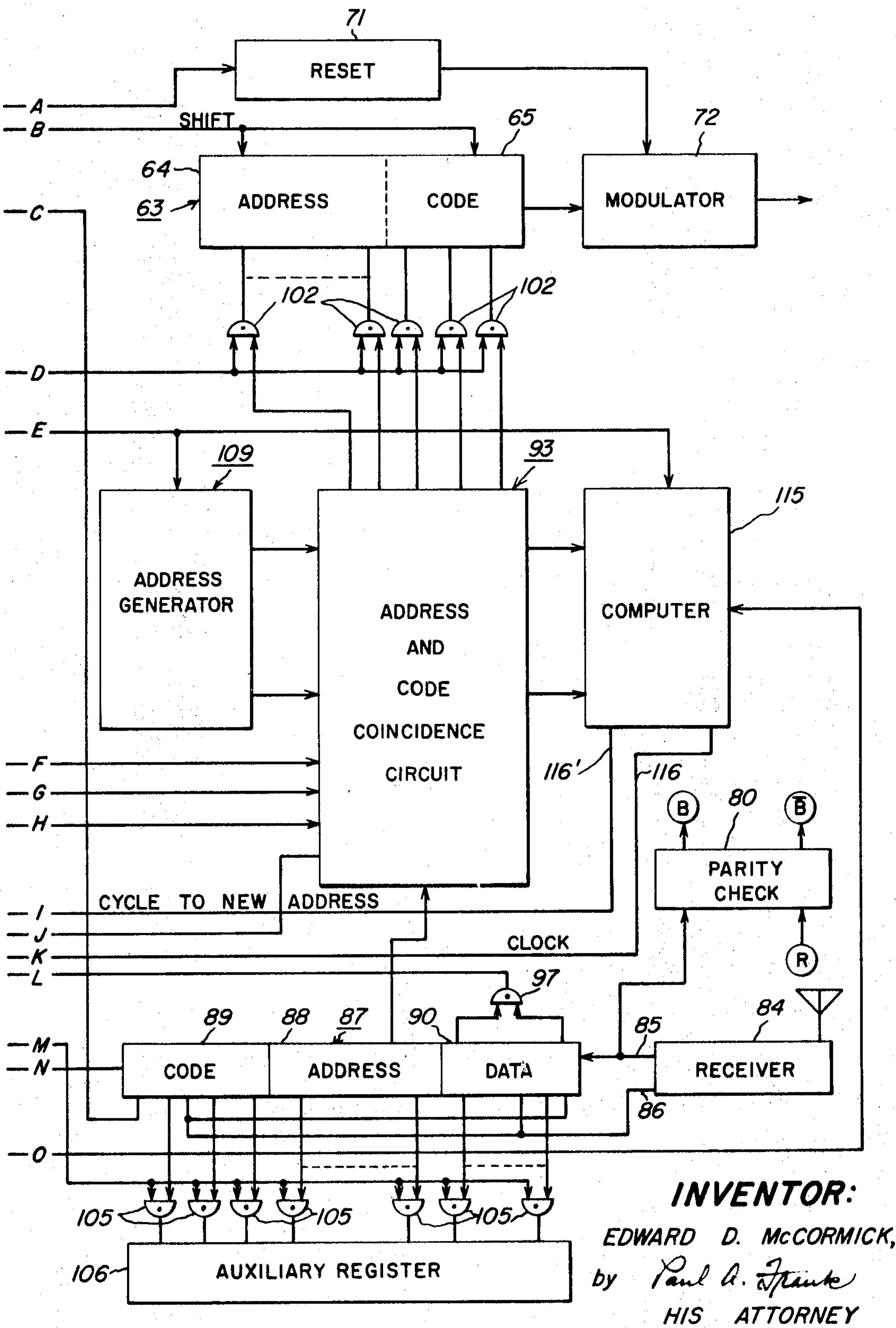

FIGS. 3*a* and 3*b* together comprise a schematic of a central station utilized in the operation of the communication network of my present invention.

Figure 4:
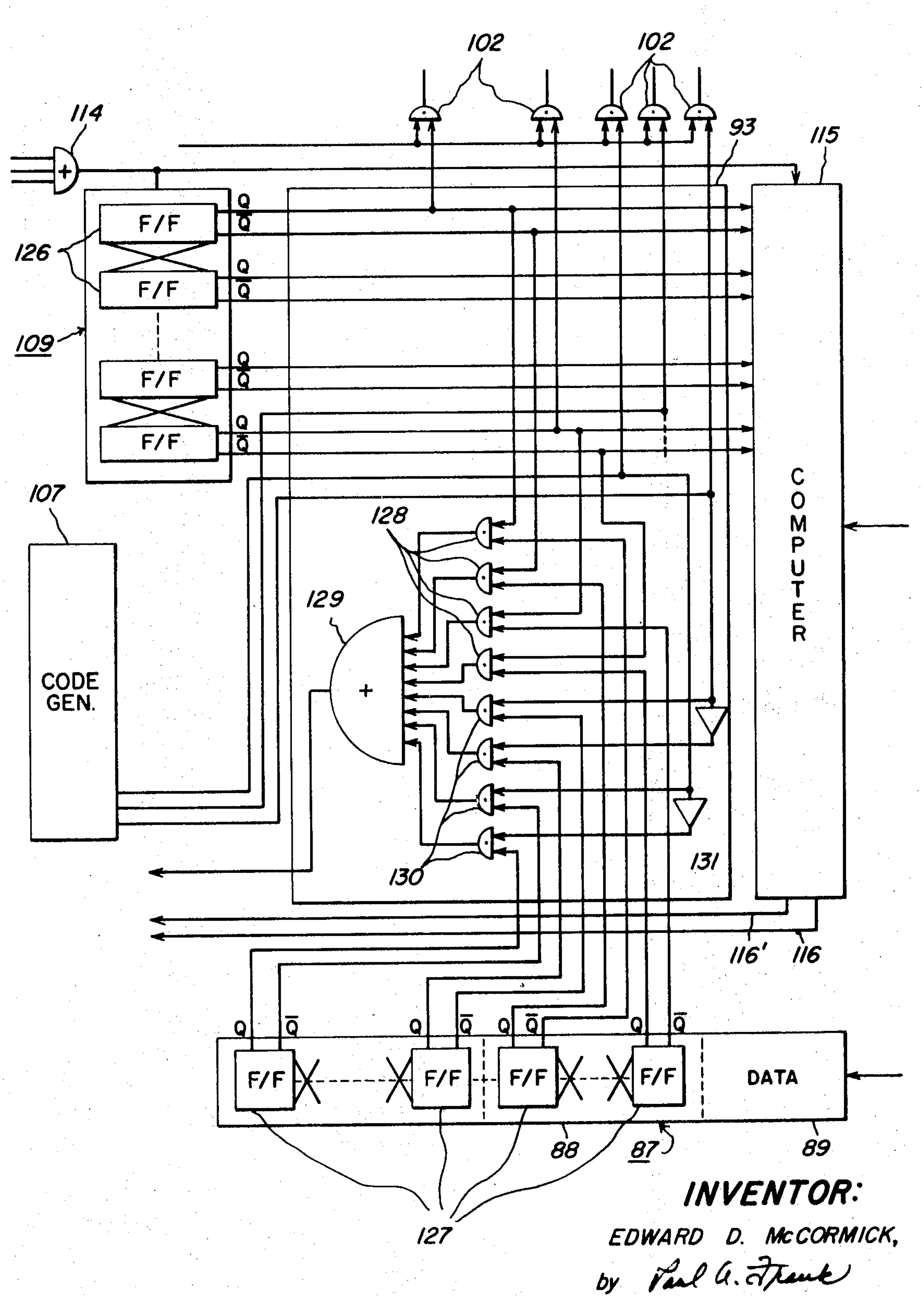

FIG. 4 is a more detailed schematic of the address coincidence circuit illustrated initially in FIGS. 3*a* and 3*b*.

In order to more fully understand the communication network of my present invention, the flow diagram of FIG. 1 is utilized to functionally explain the operation of the network prior to proceeding to the explanation of the circuitry. As illustrated in FIG. 1, the system of my invention may be employed in a community television antenna network commonly known as CATV. The head end transmitter 10 may be closely associated with a central station 11 or included as an integral part thereof. Head end transmitter 10 may be connected by a suitable transmission medium such as coaxial cable 12 to a plurality of video receivers, one of which is depicted by video receiver 13. As illustrated, central station 11 is also connected to a remote communication response unit such as CRU 14 via coaxial cable 12. Video receiver 13 is preferably positioned in the close proximity to CRU 14.

It is understood that other transmission media, such as microwave guides, wire pairs, or air waves, may be employed as communication conduits in the system of my present invention. Coaxial cable 12 is used for purposes of description only.

To illustrate more fully one use of the system described herein, head end transmitter 10 is transmitting a video signal on line 15 which is received by video receiver 13 and displayed on screen 16 as book 17 and corresponding catalog order number 18. Book 17 may represent one of a number of articles being offered for sale to the operators of various CRUs. An operator wishing to purchase book 17 enters either a yes response or catalog order number 18 through an appropriate peripheral input device (not shown) into CRU 14. A communication response unit which may be employed with the system of my present invention is disclosed and claimed in the aforementioned copending application now U.S. Pat. No. 3,541,257, and is incorporated by way of reference herein. Several embodiments are shown therein of CRU which accepts either a simple positive or negative input or more complex input data. For ease of description herein, CRU 14 of FIG. 1 is also illustrated functionally only and discussed as being capable of receiving complex data such as catalog order number 18. Thus, assuming the operator wishes to purchase book 17, appropriate peripheral equipment (not shown) is used to generate an input data signal 19 carrying catalog order number 18 which enters into data storage 20 in CRU 14.

In the example being used, central station 11 commences a series of communication cycles with the CRUs. Each CRU is, in effect, interrogated as to the desire of its operator to purchase the displayed article. Thus, each CRU is individually addressed in a corresponding communication cycle. The addresses of the CRUs (and therefore communication cycles) are arranged in a predetermined order which may be, for example, an ascending numerical arrangement. It is important to note that after a communication cycle is started central station 11 will not address any other CRU until the present communication cycle is completed.

In the illustration of FIG. 1, central station 11 has initiated a communication cycle which includes the address of CRU 14. Thus, the unit address of CRU 14 which is arranged in a unique or singular pattern is shifted from address storage 21 along with read function encoder 22 to transmitter 24. The unit address and read function code is transmitted via signal line 25 to receiver 26 located in CRU 14.

Meanwhile, central station 11 waits for a predetermined time as determined by wait unit 27. When a response signal via line 28 is not received by signal detector 29 before the time interval has lapsed, the address is recorded by recorder 30, which may be any appropriate recording device, and shift function signal generator 32 initiates a new communication cycle through address storage 21 with the CRU next in order.

Looking again at CRU 14, it is understood that all other CRUs receive the same information. The address and read function code portions of the information are stored in each CRU as done respectively in address storage 33 and function storage 34 of CRU 14. Before CRU 14 is able to operate, however, there must be coincidence between the address portion and the prewired address of CRU 14. Address coincidence detector 35 scans the address in address storage 33 and finds match 36. Conversely, in the remaining units a mismatch 37 is found, thus precluding operation of those units. Function decoder 38 in CRU 14 interprets the information stored in function storage 34 and finds read function code signal 39. Address match 36 and read function code signal 39 allow transmitter 41 to transmit data, herein the catalog number, and the CRU address as a data response signal back to signal detector 29 in central station 11 via line 28.

As previously discussed, central station 11 is waiting under the control of wait unit 27. Because the data response signal via line 28 is received before expiration of the predetermined time interval, the address is not recorded in recorder 30. Instead, the response data and address of CRU 14 are checked for transmission errors by data checker 42.

Assuming there were no errors as indicated by correct function mode signal 43, clear function code 44 along with the proper unit address is transmitted by transmitter 24 back to CRU 14 which functions in a similar manner as before. The data sent by CRU 14, i.e. the catalogue number, is stored in data stored circuit 40 that is, address coincidence detector 35 compares the stored address portion and function decoder 38 decodes the stored function. Address match 36 and clear signal 45, however, act to clear the data out of CRU 14 as indicated by reset 46. This indicates to the operator that his data has been received.

In another mode of operation, which is initiated by an error in transmission as determined by data checker 42, central station 11 operates in a retransmit mode 47. In retransmit mode 47, transmitter 24 is ordered to retransmit the address and read function code back to CRU 14. When there is again error in data response signal on line 28, central station 11 operates in an error mode 48 in which transmitter 24 is ordered to transmit error function code 50 and the proper address to CRU 14 and shifter 51 is ordered to shift central station 11 into a new cycle of communication.

In CRU 14, function decoder 38 decodes the stored error command portion as error signal 52 which energizes error indicator 53 and clears data storage 20 of data stored therein. Thus, the operator of CRU 14 realizes that although his message has been received, it is considered to be erroneous by central station 11.

In the above discussion, it has been assumed that the CRU operator wishes to purchase book 17. Should the operator wish to reject the offer, he may do so by merely not entering data into CRU 14. When CRU 14 is signaled with the proper address accompanied by a read command function, CRU 14 responds by sending an "idle" message as idle response signal via line 28 back to central station 11. When message check 42 determines that the signal is an idle signal, central station 11 operates in an idle mode 54, and orders shifter 51 to initiate a new cycle. It is important to observe that communications between central station 11 and CRU 14 end when idle response signal 28 is received by central station 11.

Figures 2, 2A, 2B, 2C, 2D:
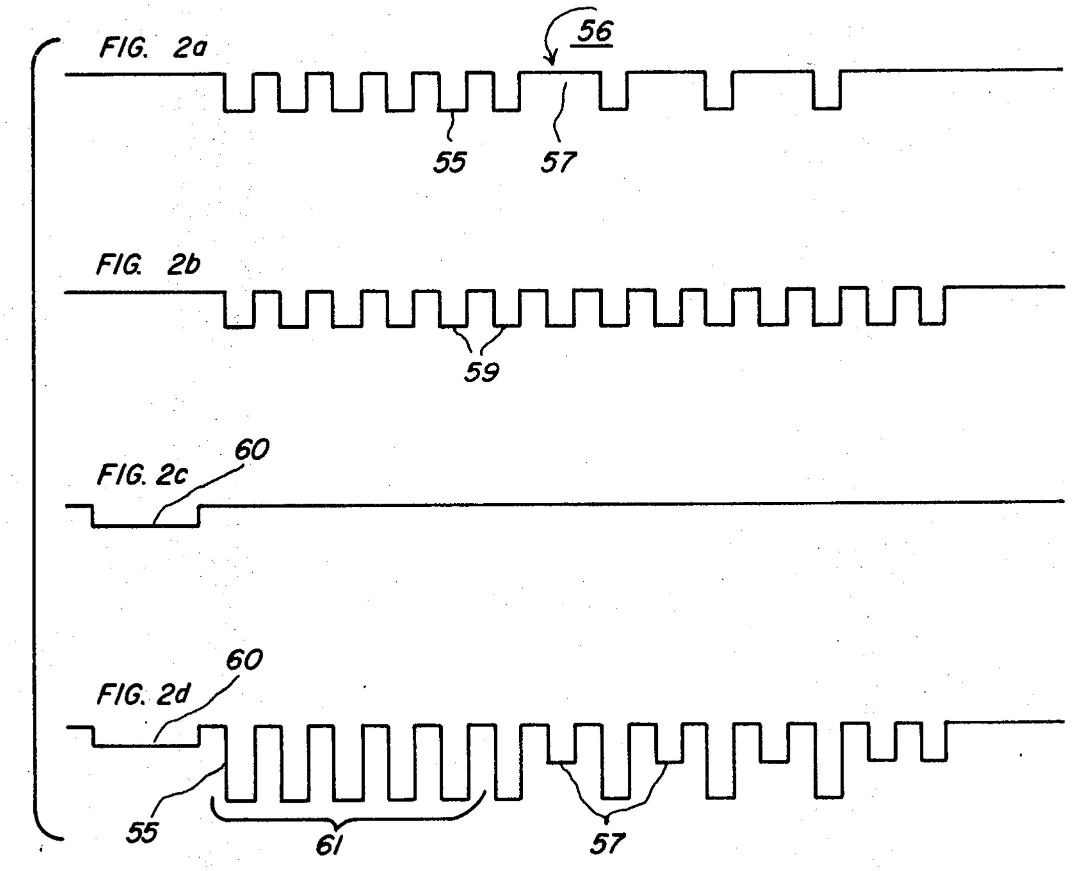

It may be convenient to transmit information between the central station and the plurality of communication response units in binary coded decimal (BCD) form. It should be understood, however, that the communication system of my present invention is adaptable to other coded forms of information, thus, the following is for descriptive purposes only. FIG. 2*a* schematically represents a typical electrical representation. The amplitude 55 of square wave 56 may represent a logic one while amplitude 57 may represent a logic zero.

FIG. 2*b* illustrates a square wave bearing synchronizing clock pulses 59. Clock pulses 59 are utilized to time-synchronize the various operating and memory elements in the central station and communication response units. The characters all have "odd" parity, thus enabling the central station to discern errors in transmission should the characters arrive with even parity.

FIG. 2*c* shows a single pulse 60 which is used as a "reset" in the CRU 14. The reset pulse, described in more detail herein and in aforementioned copending application, now U.S. Pat. No. 3,541,257 of Edward D. McCormick et al., generally functions as a signal to clear the registers employed in each CRU just prior to storing the address and command function information.

FIG. 2*d* illustrates the superposition of signals in FIGS. 2*a*, 2*b*, and 2*c* into a single multiple level binary data signal representing a complete message. This signal called a three-level "return-to-zero" binary coded signal is the coded output of the central station. Logic one is still represented by amplitude level 55 and logic zero is represented by level 57 though both are superimposed on clock signal 59. The binary zero level may, for example, be less than the binary one level by about 20 percent while the reset pulse may be less than the binary one level by about 50 percent.

For purposes of description and defined therein, five binary symbols or "bits" comprise a single "character" with one bit being for character parity. In FIG. 2*d*, for example, portion 61 of square wave 56 is an electrical representation of a character containing five bits, 11111, which may be the function code "read." The other function codes, "clear" and "error," may be represented by 10101 and 11101 characters, respectively. For ease of description coded addresses are discussed as consisting of four characters or twenty bits when the addresses of the CRUs are numerical, a four character address may go numerically from 0000 to 9999, thus encompassing 10,000 separate CRUs. It is understood, however, that the number of characters in the address may be increased when desired to facilitate a larger network.

Again using a CATV network as an example and referring to FIG. 1, I have found that it is convenient to transmit both video signal 15 and digital signal 35 herein called "forward information" moving from transmitter 10 and central station 11 in the VHF band (54 to 216 MHz.). The "reverse" digital signals moving from the plurality of CRUs to central station 2 may be transmitted in a band below the VHF band, or alternatively, in a 2–4 MHz. bandwidth in the spectrum between channels 13 and 43. The full VHF band has a capacity for approximately 22 TV channels plus the FM band.

The bandwidth for data channels is governed by the data rate and modulation method. A 2 MHz. bandwidth is needed for a bit rate of 1 MHz. using double side band amplitude modulation. The high data rate makes it possible to interrogate CRUs at a high rate of speed approaching 10,000 units in two seconds for a bit generation of 1 MHz. A 2–4 MHz. bandwidth with 140.5 MHz. and 20 MHz. carrier waves have been found sufficient for the forward and reverse signal channels, respectively.

FIGS. 3*a* and 3*b* comprise a schematic of a central station circuit which may be utilized in the operation of my present invention. As a starting point, storage register 63 having address section 64 and code section 65 is respectively filled with the unit address of a selected CRU and the "read" function code. Clock pulse generator 66 continually generates pulses of a predetermined frequency. Divide-by-four counter 67 is in a reset state. That is, the Q and $\overline{Q}$ outputs are respectively low and high. Thus, AND gate 68 is closed and AND gate 69 is open (all other inputs thereto being high). Also the two inputs to AND gate 70 are open to initiate the reset generator 71. Four clock pulses from generator 66 proceed through AND gate 69 to counter 67. After four clock pulses, counter 67 changes state closing gate 70 and terminating the reset pulse from generation 71. A reset pulse having a duration of four clock pulses is generated and is transmitted via modulator 72. The duration of the reset pulse is arbitrary, however, and may be made of any desired interval by selecting appropriate counters.

After four clock pulses, counter 67 changes state, Q going high while $\overline{Q}$ goes low. Thus, AND gates 69 and 70 are closed and AND gate 68 is opened. Clock pulses from generator 66 proceed through AND gate 68 and shift the address and read code function from register 63 into modulator 72 for transmission to the addressed CRU. The clock pulses also enter counter 73 through open AND gate 74 and OR gate 75. Counter 73 shifts state in response to the total number of pulses necessary to shift a complete message (address, code, and clock pulses) into modulator 72. A plurality of flip-flop circuits 76, 77, 78, 79, and 91, counter 67, and parity check circuit 80 are tied into the output of OR gate 82 so as to be reset prior to counter 73 shifting state. This reset connection is indicated by R located at each of the above elements. When counter 73 shifts state, flip-flop circuit 81 is reset via OR gate 82 and the Q output goes low, thus closing AND gate 68 and starting operation of one shot timer 83. When AND gate 68 closes, the clock pulses are blocked from entering counter 113, register 63, and counter 73.

During the predetermined operational time of one shot timer 83, the central station is ready to receive signals in response from the communication response unit.

To facilitate understanding, the description below is subdivided into parts corresponding to the mode of operation of the central station. As stated before, this depends upon the response (data, idle, or none) received from the remote units.

DATA RECEIVED–NO ERROR

Initially, the response signal is received by receiver 84; the data signal 85 and clock signal 86 are separated by appropriate equipment (not shown). Data signal 85 enters into storage register 87 having an address section 88, function code section 89, and data section 90. When register 87 is completely filled, flip-flop circuit 91 is responsive to a data full signal from register 87 (the first binary bit) and changes to the set state. When flip-flop 91 is in a set state, AND gate 92 is closed, precluding timer 83 from interfering with the operation of the central station. As the data signal 85 is entering into register 87, parity checker 80 is analyzing each character in signal 85 for the correct parity. As stated before, each character of the data is designed to have odd parity. The output of parity checker 80 establishing the presence of correct parity, the Q output of flip-flop circuit 91, and the output from address and code coincident circuit 93 via inverter 94 enter into AND gate 95. Though explained in more detail below, it should be noted that coincident circuit 93 produces a high output only when there is a lack of coincident (mismatch), thus for purposes here necessitating the use of an inverter 94. AND gate 96 receives a high output via AND gate 97 acting as an indicator of the presence of data, and from AND gate 95. The data may be arranged to have binary ones in the first and last position so that there will be an output from AND gate 97 simultaneously with the output from AND gate 95 when register 87 is filled. An idle message having binary zeros in the selected position or positions causes the AND 97 output to be low, thus opening AND gate 98 as discussed in connection with an idle response message below.

The high output from AND gate 96 does the following: (1.) insures that flip-flop circuits 99 and 101 are in the reset position; (2.) sets flip-flop circuit 100; (3.) opens AND gates 102 via OR gate 103; (4.) sets flip-flop circuit 76; (5.) sets flip-flop circuit 81 via OR gate 104; and (6.) opens AND gates 105 leading to auxiliary register 106. Initially, the opening of AND gates 105 allows the data in register 87 to be removed. The setting of flip-flop circuit 100 through the encoding matrix 107 generates a "clear" function code which enters register 63 through the now open AND gates 102. Encoding matrix 107 may comprise a matrix of diodes 108 designed to generate function codes of a predetermined pattern. For the sake of brevity, the number of bits generated to make a function code is shown as three as opposed to the five bit characters discussed in relation to FIG. 2. Thus, the READ function is represented as logic 011, the CLEAR function is represented as logic 001 and the ERROR function is represented as logic 101.

Simultaneously with the code generation, the original address from the address generator 109 is regenerated and also reenters register 63. Flip-flop circuit 81 being set opens AND gate 69 to the clock signal which proceeds through counter 67 (reset) and initiates transmission of the reset pulse as before. When the reset pulse has been generated (four clock pulses), AND gate 68 is opened allowing the clock pulses to enter register 63, and flip-flop circuit 76 opens AND gate 111, allowing the clock pulses to go through OR gate 112 and enter counter 113. When the address and clear code have been clocked out of register 63, counter 113 (which is responsive to the total number of pulses needed to clock out the unit address and function codes) changes state and through OR gate 114 causes address generator 109 to generate the next unit address and through OR gate 82 causes a reset pulse to be generated. Counter 67, flip-flop circuits 76, 77, 78, 79, 91 parity check circuit 80, and flip-flop 81 are reset as indicated by R and the clock signal of clock generator 66 is again blocked by closed AND gates 68, 69.

The signal from OR gate 114 is also received by computer 115 causing a determination of the status (valid or invalid) of the unit address to be made, i.e., whether, for example, the monthly subscription bill has been paid. When the unit address of the CRU is determined to be valid, flip-flop circuit 79 is placed in a set state by signal 116 from computer 115, therefore, again opening AND gates 102 and AND gate 74. Simultaneously, flip-flop circuit 99 is set by counter 113 allowing a read code to be generated by code generator 107. The read code and new address enters register 63 through AND gates 102. Flip-flop circuit 79 and 81 are set by a signal on line 116 via OR gate 104, opening AND gate 69, thus again initiating the generation of a reset pulse followed by transmission of the address and read code.

Should computer 115, however, determine the unit address to be invalid, a signal is via line 116' to address generator 109 via OR gate 114 causing the generation of the next address in the predetermined sequence and thus initiating a new communication cycle.

Data Received–Error

If there is an error in parity or there is no coincidence between the transmitted and received unit address (or between transmitted and received function codes), either AND gates 117 or 118 allows flip-flop circuit 119 to be triggered via OR gate 121. When triggered, flip-flop circuit 119 opens gate 122 and initiates the following operations: (1.) insures flip-flop circuits 100 and 101 are reset; (2.) sets flip-flop circuit 99; (3.) opens AND gates 102 via OR gate 103; and (4.) sets flip-flop circuit 81 and flip-flop circuit 78. Thus, the effect of the above is to clock a reset pulse followed by the same address and read code to modulator 72.

Should the signal received in response to the reinterrogation be correct, the central station functions in a manner identical to the mode of operation occurring when the response data signal is initially correct. Assuming, however, the data signal is again incorrect, flip-flop circuit 119 is again triggered. The triggering at this time places flip-flop circuit 119 in the opposite state and therefore opens AND gate 123 and initiates the following: (1.) insures flip-flop circuits 99 and 100 are reset; (2.) sets flip-flop circuit 101; (3.) opens AND gates 102 via OR gate 103; and (4.) sets flip-flop circuit 81 and flip-flop circuit 77. Thus, a reset pulse followed by the same address and an error code is clocked to modulator 72. Flip-flop circuit 77, however, allows clock pulses to enter counter 113, thus initiating the generation of the next address in the predetermined when counter 113 is cycled through capacity.

Idle Message Received–No Error

When the output of AND gate 97 is low, as in the case of an idle response message, inverter 124 allows AND gate 98 to open. Flip-flop circuit 99 is set, allowing a read code to be generated and also initiating operation of the address generator 109. As is readily evident, no clear code is sent when an idle response message is received by the central station.

When there is either a parity error or lack of coincidence, it may be readily seen that the central station operates to readdress the communication response unit as before.

No Message Received

When no message is received in the predetermined time, timer 83 changes state (low). AND gate 92 therefore receives two identical signals, one from timer 83 and one from flip-flop circuit 91, and passes a no-message-returned signal 125 to computer 115. Computer 115 stores the address of the nonresponding communication response unit and produces signal 116' which, as before, cycles address generator 109 via OR gate 14 to the new address in the predetermined sequence.

FIG. 4 is a more detailed schematic of the address coincident circuit and related elements initially illustrated in FIG. 3. As is readily seen, address generator 109 comprises a plurality of flip-flop circuits 126. Similarly, register 87 comprises a plurality of flip-flop circuits 127 with the address section 88 thereof having a number of flip-flop circuits within corresponding to the number of flip-flop circuits 126 in address generator 109. A plurality of AND gates 128 have their outputs tied into OR gate 129. The Q output of each flip-flop circuit 126 is paired with its corresponding $\overline{Q}$ output of the flip-flop circuits 127 as the inputs enter each of the AND gates 128. Similarly, the Q outputs of flip-flop circuits 127 and the $\overline{Q}$ outputs of the corresponding flip-flop circuits 126 are also tied in to AND gates 128.

Thus, in operation, the output of OR gate 114 as previously stated causes address generator 109 to generate a new address in the predetermined sequence. Simultaneously, OR gate 114 causes computer 115 to check the new address as to status and to initiate transmission of the address through signal 116. When the unit address is received in response to the transmitted address and code and stored in address section 88 of register 87, a coincident check can now be made. As is readily evident AND gates 128 remain closed when there is coincidence. When, however, the reverse is true, one or more AND gates 128 are opened, allowing a pulse to pass therethrough into OR gate 129 and out of address and code coincidence circuit 93.

To determine code coincidence, a plurality of AND gates 130 are used in a manner similar to that of the AND gates 128. That is, the inputs to each of the AND gates 130 comprise an output from code generator 107 and from a corresponding flip-flop circuit 127 in the code section of register 87. In order to insure that AND gates 130 are closed and there is coincidence between generated and received codes, it is necessary to utilize a plurality of inverters 131 in the outputs of code generator 107. Thus, the direct outputs of code generator 107 are paired with the complementary outputs of the corresponding flip-flop circuits 127 as the inputs to the AND gates 130. Therefore, when there is coincidence AND gates 130 remain closed and conversely, when there is a lack of coincidence, one or more AND gates 130 are opened, passing a pulse into OR gate 129 and out of addressing code coincident circuit 93 as before.

In summary, the central station initiates a communication cycle through the generation of a reset pulse (reset pulse generator 71) generation of a unit address (address generator 109), generation of a read function code (code generator 107), shifting action of clock generator 66, and subsequent transmission by modulator 72.

Concurrently, timer 83 is set which operates for a predetermined time interval. Should a response signal, either a data or idle signal, be received by receiver 84 and register 87 prior to the end of the time interval, the operation of the timer is interrupted through closing of AND gate 92 caused by the change of state of flip-flop circuit 91. The central station then commences to compare via coincident circuit 93 the transmitted and received unit addresses and checks the parity of the received signal via parity circuit 80. Simultaneously, the station checks through OR gate 97 the pattern of the signal to determine whether the response signal is a data or an idle signal.

When the data signal is received with an address match and no errors, the code generator 107 generates a clear function code which along with the unit address is transmitted to the communication responding units. The clear code function enables the addressed unit to clear the data stored therein in preparation for more data.

The idle signal with an address match and no parity error causes the address generator to cycle to a new unit address. Therefore, the central station initiates a new communication cycle.

Either an address mismatch determined by coincidence circuit 93 or a parity error determined by parity checker 80 results in register 63 storing the unit address and read function code again. Thus, when AND gate 69 is opened, the clock generator 66 causes reset generator 71 to generate a reset pulse after which AND gate 68 is opened, allowing the clock pulses to shift the unit address and read function code to modulator 72 for transmission. A second occurrence of mismatch or parity error causes an error code function to be generated and transmitted along with the same unit address.

Having described several features of a novel communication network and the central station thereof, it is considered that modifications and variations would be obvious to one skilled in the art in light of the above teachings. Thus, the coincidence and other circuits may be redesigned to include other electrical elements such as NAND gates and the like. The number of function codes generated by the central station may be increased. The number of bits (and characters) utilized may also be increased when larger networks and more complex flow of data are desired. It is understood, therefore, that changes may be made in the features of my invention described herein which are within the full intended scope of the invention as defined by the following claims.

What I claim as new and desire to secure by Letters Patent of the United States is:

1. A central station, in a communication network for communicating with a plurality of response units in a sequence, comprising:

means for transmitting to a response unit an interrogation signal requesting the response unit to read information contained therein, said means for transmitting preceding each transmission with a reset signal to ensure proper reception of the interrogation signal;

receiver means for receiving return messages from a plurality of response units, said return messages having address, function and data portions;

error detecting means coupled to said means for transmitting and to said receiver means for detecting errors in the return messages; said error detecting means, in response to an error-free return message, causing said means for transmitting to transmit to the responding unit a signal indicative of error-free reception and, in response to an erroneous return message, causing said transmitting means to retransmit an interrogation signal to the same response unit at least once;

cycle control means, coupled to said means for transmitting, for initiating transmission to another response unit after transmission of either said signal indicative of error-free response or the last retransmission in response to an erroneous return message.

2. A central station as set forth in claim 1, further comprising:

data detecting means coupled to said receiver means and said means for transmitting for detecting the presence of data in the return message; said data detecting means, in response to a no-data return message, causing said transmitting means to transmit immediately an interrogation signal to another response unit; and, in response to a data-present return message, causing said transmitting means to transmit in accordance with said error detecting means.

3. A central station as set forth in claim 2, further comprising:

return message detecting means, coupled to said receiver means and said means for transmitting, for detecting the reception of a return message within a predetermined time interval after said interrogation signal is transmitted;

said return message detecting means causing said means for transmitting to transmit to another response unit when no return message is received within said predetermined time interval and allowing said means for transmitting to transmit in accordance with said error detecting and data detecting means when a return message is received within said predetermined time interval.

4. A central station as set forth in claim 1, further comprising:

return message detecting means, coupled to said receiver means and said means for transmitting, for detecting the reception of a return message within a predetermined time interval after said interrogation signal is transmitted;

said return message detecting means causing said means for transmitting to transmit to another response unit when no return message is received within said predetermined time interval and allowing said means for transmitting to transmit in accordance with said error detecting means when a return message is received within said predetermined time interval.

5. A central station as set forth in claim 1 wherein said error detecting means comprises:

address and function coincidence detecting means for comparing the address and function transmitted to a response unit with the address and function received from that response unit.

6. A central station as set forth in claim 5 wherein said error detecting means further comprises:

parity checking means for checking said data portions for proper parity.

7. A central station as set forth in claim 1 wherein said signal indicative of error-free reception comprises the address of the responding unit and a clear function code which clears the data storage registers of the responding unit; and wherein said transmitting means retransmits said interrogation signal only once.

8. A central station as set forth in claim 7 wherein said cycle control means comprises transmission completion sensing means for sensing the complete transmission of said address and clear function code and initiating transmission to another response unit upon sensing a complete transmission.